United States Patent
Seymour

(10) Patent No.: US 6,895,763 B1
(45) Date of Patent: *May 24, 2005

(54) DISPOSABLE CONTAINER

(76) Inventor: Michael L. Seymour, 1717 E. 15th St., Tulsa, OK (US) 74104

(*) Notice: Subject to any disclaimer, the term of this patent is extended or adjusted under 35 U.S.C. 154(b) by 0 days.

This patent is subject to a terminal disclaimer.

(21) Appl. No.: 10/441,759

(22) Filed: May 19, 2003

Related U.S. Application Data

(63) Continuation-in-part of application No. 09/992,267, filed on Nov. 14, 2001, now Pat. No. 6,564,558, which is a continuation-in-part of application No. 09/680,173, filed on Oct. 5, 2000, now abandoned.

(51) Int. Cl.[7] ............................ F25D 5/00; B65B 63/08; F24J 1/00; F24J 3/00
(52) U.S. Cl. ............................. 62/4; 62/60; 126/263.08
(58) Field of Search ................ 62/4, 60, 371; 126/263.08, 263.05, 263.06, 263.07

(56) References Cited

U.S. PATENT DOCUMENTS

| | | | | |
|---|---|---|---|---|
| 2,300,793 A | * | 11/1942 | Martin ................... 126/263.08 |
| 2,622,415 A | * | 12/1952 | Smith et al. ............... 62/457.3 |
| 2,968,932 A | * | 1/1961 | Vance et al. ................ 62/4 |
| 3,149,943 A | * | 9/1964 | Amador ..................... 62/4 |
| 3,494,143 A | * | 2/1970 | Barnett et al. .............. 62/294 |
| 3,653,372 A | * | 4/1972 | Douglas ................. 126/263.09 |
| 3,726,106 A | * | 4/1973 | Jaeger ..................... 62/294 |
| 3,865,117 A | * | 2/1975 | Perry, III .................. 607/114 |
| 3,957,472 A | * | 5/1976 | Donnelly .................... 62/4 |
| 4,462,224 A | * | 7/1984 | Dunshee et al. .............. 62/530 |
| 4,753,085 A | * | 6/1988 | Labrousse .................. 62/294 |
| 4,773,389 A | * | 9/1988 | Hamasaki ............... 126/263.07 |
| 5,845,806 A | * | 12/1998 | Parchman ................... 220/739 |
| 6,119,465 A | * | 9/2000 | Mullens et al. ............... 62/60 |
| 6,209,344 B1 | * | 4/2001 | Mahajan .................... 62/457.3 |
| 6,233,945 B1 | * | 5/2001 | Kohout ..................... 62/4 |
| 6,564,558 B1 | * | 5/2003 | Seymour .................... 62/4 |

* cited by examiner

Primary Examiner—William C. Doerrler
(74) Attorney, Agent, or Firm—LaRiviere, Grubman & Payne, LLP

(57) ABSTRACT

A disposable container which has the ability to independently cool or heat a liquid beverage or food product by way of an endothermic or exothermic reaction. The container is disposable and has a double walled configuration to create a chamber therebetween. Within the chamber is a chemical compound which when activated provides the desired reaction upon the contents within the container. Thus, there is no requirement that this device must be subjected to external refrigeration or heat.

8 Claims, 2 Drawing Sheets

DISPOSABLE CONTAINER

REFERENCE TO PENDING APPLICATIONS

This application is a continuation-in-part of U.S. patent application Ser. No. 09/992,267 filed on 14 Nov. 2001 now U.S. Pat. No. 6,564,558 entitled A DISPOSABLE SELF-COOLING, SELF-HEATING CONTAINER, which is a continuation-in-part of U.S. patent application Ser. No. 09/680,173 filed on 05 Oct. 2000 now abandoned entitled A DISPOSABLE SELF-COOLING, SELF-HEATING CONTAINER.

REFERENCE TO MICROFICHE APPENDIX

This application is not referenced in any microfiche appendix.

BACKGROUND OF THE INVENTION

The present invention is generally directed toward a container, specifically toward a disposable cooling/heating container. Containers designed to cool liquid beverage or foodstuff have been known heretofore, however, such containers have been constructed of material which prohibits disposability of such containers. For example, U.S. Pat. No. 2,622,415 issued to Landers on Dec. 23, 1952 discloses a device for chilling foodstuffs. The device is made from glass or other molded cast materials.

The prior art cooling and heating containers also demonstrate another disadvantage in that materials utilized for effectuating the cooling or heating effect do not produce such effect independently. These prior art devices are typically designed for multiple use and therefore utilize gels and chemical compounds which can be heated and cooled repeatedly. The gels or chemical compounds are refrigerated or heated in an oven or similar device prior to use with the beverage or foodstuff. This type of device is limited in its applicability and is significantly costly to develop.

There is therefore a need for a container constructed of a disposable material which can provide an independent cooling or heating effect upon a liquid beverage or food product. The cooling or heating effect would be provided by a material which can create its own cooling or heating sensation.

BRIEF SUMMARY OF THE INVENTION

The present invention satisfies the needs discussed above. The present invention is generally directed toward a container, specifically toward a disposable container which produces a cooling or heating effect.

The present invention is directed towards a disposable container which has the ability to independently cool a liquid beverage or heat a food product. The container is made from easily disposable material, such as a plastic product. The container includes a body having a double walled configuration wherein is a cooling or heating means is located.

The cooling or heating means is a chemical compound which when activated provides an endothermic or exothermic reaction causing a cooling or heating effect upon the contents within the container. Thus, there is no requirement that this device must be subjected to external refrigeration or heat.

Other objects and further scope of the applicability of the present invention will become apparent from the detailed description to follow, taken in conjunction with the accompanying drawings wherein like parts are designated by like reference numerals.

DETAILED DESCRIPTION OF THE PREFERRED EMBODIMENTS

Figure 1:
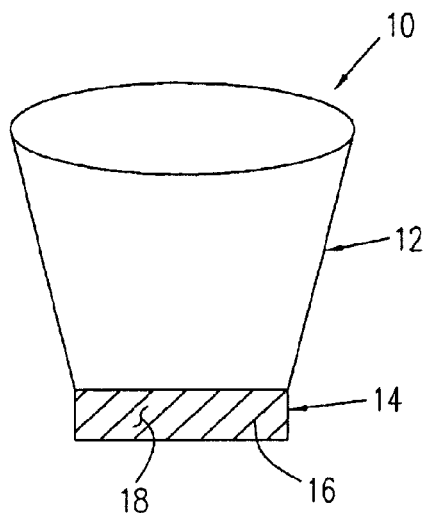
FIG. 1 is a perspective view of an embodiment of the present invention having the chamber located at the bottom portion of the cooling container.
Figure 2:
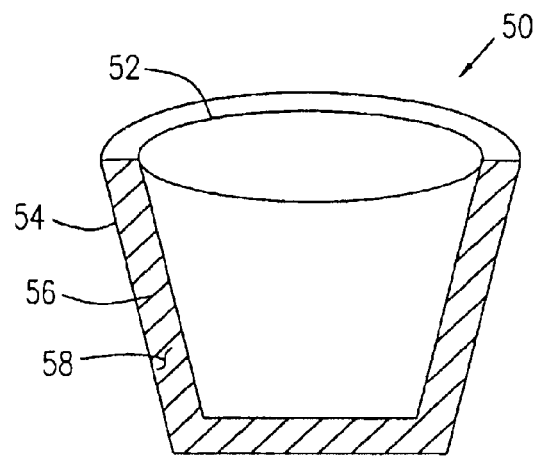
FIG. 2 is a perspective view of an embodiment of the present invention in a double walled configuration.
Figure 3:
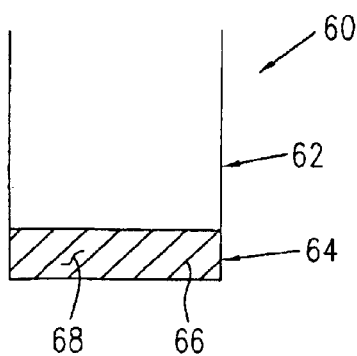
FIG. 3 is an end view of an additional embodiment of the present invention having a chamber located at the bottom portion of the container.
Figure 4:
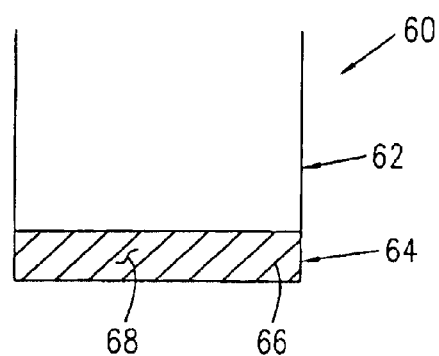
FIG. 4 is a side view of the embodiment of FIG. 3.

Before explaining the present invention in detail, it is to be understood that the invention is not limited in its application to the details of the construction and arrangement of parts illustrated in the accompanying drawings. The invention is capable of other embodiments and of being practiced or carried out in a variety of ways. It is to be understood that the phraseology and terminology employed herein are for the purpose of description and not of limitation.

An embodiment of the present invention is illustrated in the figures. A disposable container 10 is shown. Container 10 has a cup portion 12 and a chamber 14 located adjacent to and below cup portion 12. Within chamber 14 is an opening 16 in which a chemical composition for producing an endothermic or exothermic reaction is located. This composition will include a plurality of chemical components contained within rupturable pouches.

One embodiment of the chemical composition that produces an endothermic or exothermic reaction has a first chemical located within a first chemical pouch 15, a second chemical located within a second pouch 17 and a solvent located within a solvent pouch 19. When the first chemical pouch 15, second chemical pouch 17 and solvent pouch 19 rupture, the chemicals and solvent combine to produce the endothermic reaction. When pouches 15, 17 and 19 rupture, the individual chemicals contained therein flows into chamber 14 and mixes with the other chemicals from the other pouches. This mixing produces the desired endothermic or exothermic reaction.

Known chemical components which when combined create an endothermic reaction include ammonium nitrate, ammonium sulfamate, ammonium nitrite, ammonium iodide, ammonium bromide, sodium chloride, sodium nitrate, sodium nitrite, sodium carbonate, sodium bicarbonate, potassium nitrate, potassium nitrite, urea, methylurea, and combinations thereof. Additionally, it is known that water can be an acceptable solvent.

Cup portion 12 and cooling chamber 14 are made from disposable materials, such as a plastic product. This allows for the container to be utilized one time and then disposed of. While this embodiment is shown in a cup configuration, it is within the scope of the invention to include other configurations. Therefore, this embodiment is not meant to be limiting but rather is meant as an illustration.

In operation, this embodiment of the present invention is illustrated as follows. A person who desires a cold liquid beverage activates the chemical composition contained within opening 16 of container 10 by squeezing chamber 14. The chemical composition contained within first chemical pouch 15, second chemical pouch 17 and solvent pouch 19 rupture, causing such chemical to combine to produce the desired reaction.

Although the above example described the liquid beverage being placed within the container 10 after the cooling means had been activated, it is within the spirit and scope of this invention that the liquid beverage can be placed within the cup portion 12 prior to the activation of cooling means 18.

Figure 5:
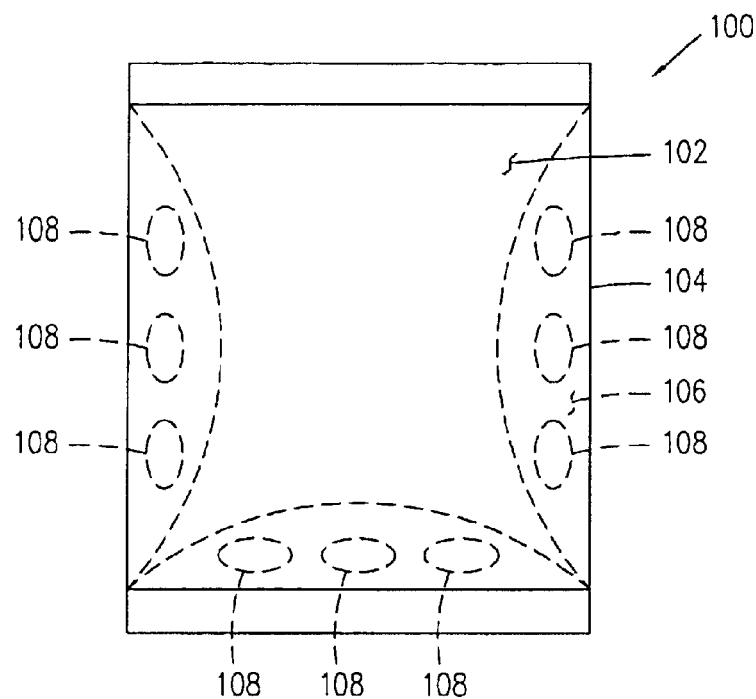
FIG. 5 is a perspective view of an additional embodiment of the present invention.

An additional embodiment of the present invention is illustrated in FIG. 5. A disposable container 100 is shown. Container 100 is illustrated as a resealable container. This is for illustrative purposes. Those skilled in the art will appreciate container 100 can take on various configurations. Container 100 having an interior 102 and includes a double-walled body 104 which defines a chamber 106. Within chamber 106 are located a plurality of rupturable pouches 108. Contained within the rupturable pouches 108 is a variety of components which when mixed together produce an endothermic or exothermic reaction is located.

The variety of components includes one or more chemicals and a solvent, such as water. The variety of components can be selected from the group of ammonium nitrate, ammonium sulfamate, ammonium iodide, ammonium bromide, sodium chloride, sodium nitrate, sodium nitrite, sodium carbonate, sodium bicarbonate, potassium nitrate, potassium nitrite, urea, methylurea, water and combinations thereof. While this embodiment includes this list of components, it is within the scope of the invention to include other components. Therefore, this embodiment is not meant to be limiting but rather is meant as an illustration.

Disposable container 100 is made from disposable materials, such as a plastic product. This allows for the disposable container 100 to be utilized one time and then disposed of.

In operation, this embodiment of the present invention is illustrated as follows. A person who desires an item of foodstuff to be heated activates the chemical composition contained within chamber 106 of disposable container 100 by squeezing disposable container 100. The rupturable pouches 108 contained within chamber 106 break causing the components contained therein to mix together creating an exothermic reaction. The foodstuff is placed within the interior 102 producing the desired heating effect upon the foodstuff. While this embodiment has the foodstuff being placed inside the interior 102 after the rupturable pouches 108 has been broken, it is within the spirit and scope of this invention to have the foodstuff or beverage be placed inside the interior 102 either before of after the rupturable pouches 108 have been broken.

Figure 6:
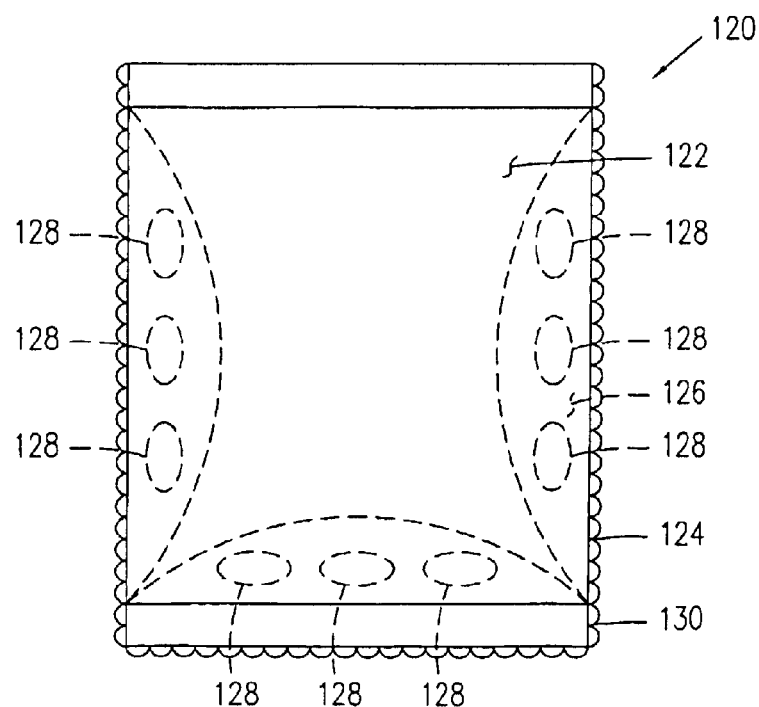
FIG. 6 is a perspective view of an additional embodiment of the present invention.

Yet an additional embodiment of the present invention is illustrated in FIG. 6. A disposable container 120 is shown. Container 120 is illustrated as a similar container to disposable container 100 shown in FIG. 5 but having a protective layer 130 along it's exterior. Protective layer 130 is illustrated as a series of air inflated packets, otherwise known as bubble wrap. The use of protective layer 130 is to limit the risk of unintentional rupturing the rupturable pouches 128. While it is illustrated that protective layer 130 is in the form of bubble wrap, those skilled in the art will appreciate this is merely illustrative and is not limiting.

The above embodiments in no way limit the present invention. It is anticipated that various configurations involving a container made of a disposable material containing a chamber in which a cooling means which can independently produce a cooling effect is located.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A container comprising:
   a double-walled container having an inner wall and an outer wall defining a interior portion for the reception of desired contents and a fully enclosed chamber located between said inner wall and said outer wall; and
   a plurality of rupturable pouches located within said fully enclosed chamber, wherein each of said plurality of rupturable pouches contains a component wherein when said rupturable pouches rupture the components contained therein mix together and produce a chemical reaction and wherein at least one of said plurality of rupturable pouches has a first chemical component contained therein and at least one of said plurality of rupturable pouches has a second chemical component contained therein and at least one of said plurality of rupturable pouches has a solvent contained therein and wherein said first and second chemical and said solvent mutually react with each other to produce heat or cold.

2. The container of claim 1 wherein said chemical reaction is an exothermic reaction.

3. The container of claim 1 wherein said chemical components are selected from the group consisting of ammonium nitrate, ammonium sulfamate, ammonium iodide, ammonium bromide, sodium chloride, sodium nitrate, sodium nitrite, sodium carbonate, sodium bicarbonate, potassium nitrate, potassium nitrite, urea, methylurea, water and combinations thereof.

4. The container of claim 1 wherein said first chemical and second chemical are selected from the group consisting of ammonium nitrate, ammonium sulfamate, ammonium iodide, ammonium bromide, sodium chloride, sodium nitrate, sodium nitrite, sodium carbonate, sodium bicarbonate, potassium nitrate, potassium nitrite, urea, methylurea, and combinations thereof, said first chemical and said second chemical being different.

5. The container of claim 1 wherein said solvent is water.

6. The container of claim 1 wherein said plurality of rupturable pouches rupture due to the squeezing of the walls of said double-walled container.

7. The container of claim 1 further comprising a protective layer attached to the exterior of said outer wall of said double-walled container.

8. The container of claim 7 wherein said protective layer is a series of air inflated pouches.

* * * * *